March 29, 1966 F. E. KIRK 3,243,577
ELECTRIC SURFACE HEATING UNIT
Filed Nov. 29, 1963 2 Sheets-Sheet 1
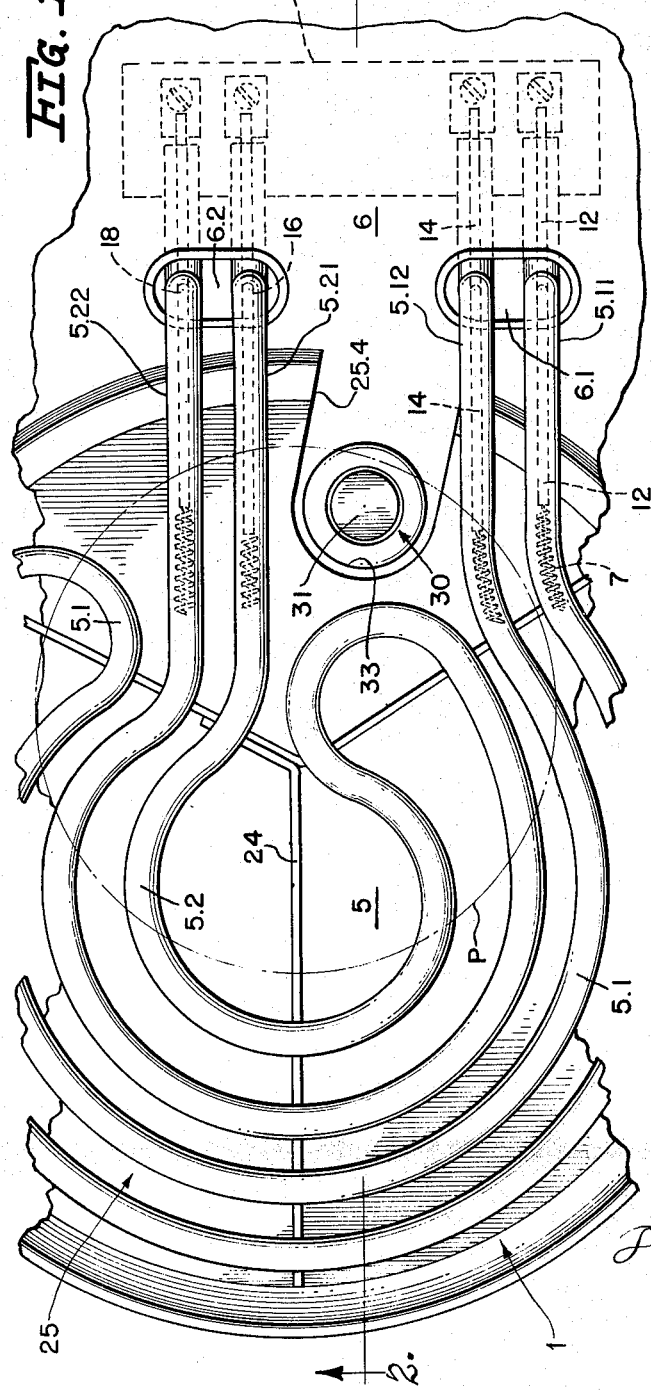
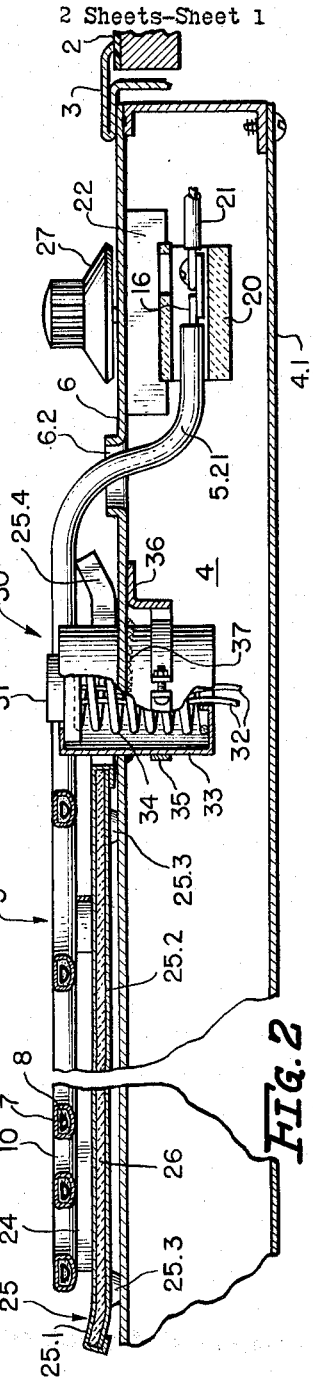
INVENTOR
Francis E. Kirk
BY Andrew G. Hubbard
Atty.

March 29, 1966  F. E. KIRK  3,243,577
ELECTRIC SURFACE HEATING UNIT
Filed Nov. 29, 1963  2 Sheets-Sheet 2
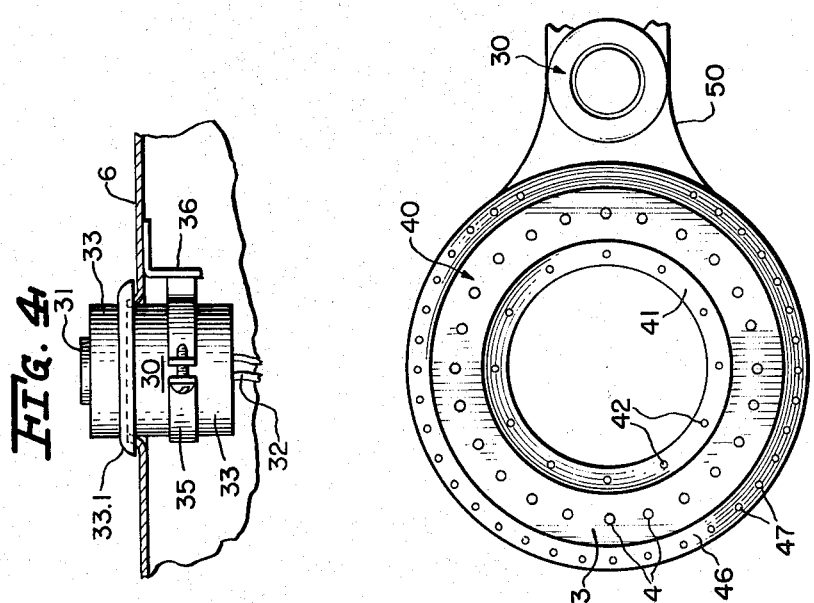
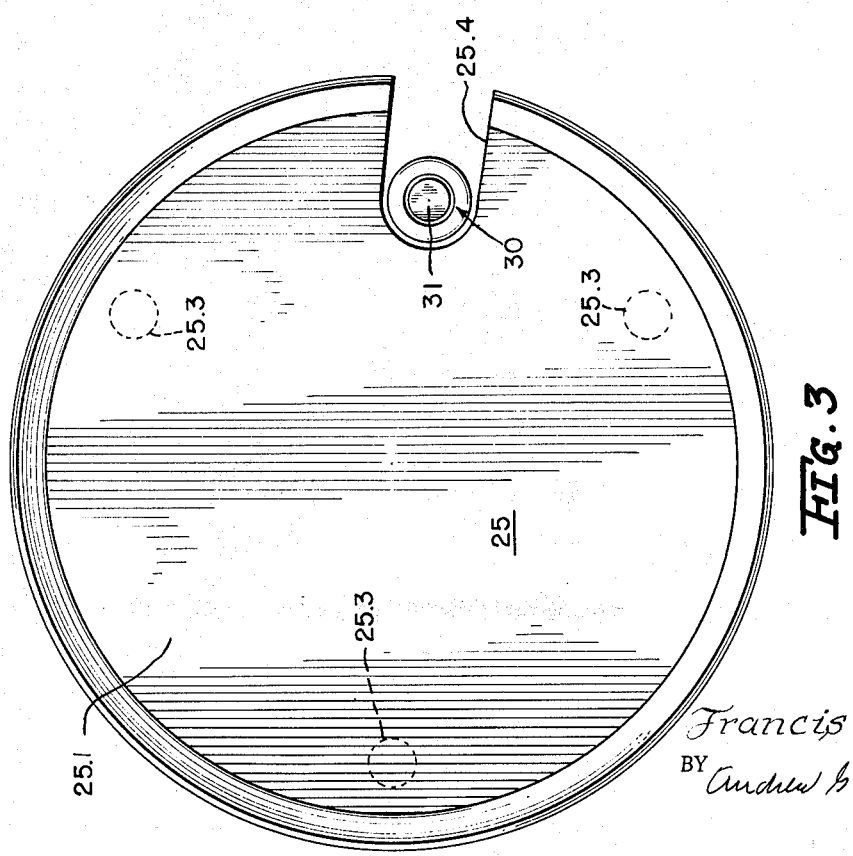
INVENTOR.
Francis E. Kirk
BY Andrew B. Aunaard
Atty.

United States Patent Office 3,243,577
Patented Mar. 29, 1966

3,243,577
ELECTRIC SURFACE HEATING UNIT
Francis E. Kirk, Oak Park, Ill., assignor to General
Electric Company, a corporation of New York
Filed Nov. 29, 1963, Ser. No. 326,813
7 Claims. (Cl. 219—450)

This invention relates to cooking appliances, and in particular to a cooking appliance having a surface cooking unit in which a sensing element provides for automatic temperature control for the cooking operation.

"Surface cooking" units are top-of-stove units on which are performed cooking operations such as boiling, frying, low temperature sauce heating, etc. Automatic temperature control for these operations is now very popular, and many manufacturers of electric and gas ranges have at least one model in which one or more of the surface cooking elements has automatic temperature control.

In electric cooking ranges, the surface cooking units may comprise one or more resistance heating elements of the tubular sheathed type arranged in a flat spiral to provide a platform on which the pan or other cooking vessel is placed; an example of such a heating element is shown in my U.S. Patent 2,565,432 of August 21, 1951. Gas ranges now popularly have ring-shaped burners providing inner and outer rings of flame. Control devices for cycling or modulating either of these forms of heating elements according to the temperature change of the cooking vessel, may be electro-mechanical, as disclosed in Weber et al., U.S. Patent 2,913,562 of November 17, 1959, and Woodward 2,970,201 of January 31, 1961, or entirely electrical, such as in Molyneaux et al., 2,727,975, granted December 20, 1955.

Regardless of the mechanism or circuitry involved in the temperature control system, all such controls of which I am aware utilize a temperature sensing element mounted at the center of the cooking unit and spring biased or otherwise arranged to make resilient contact with the bottom of the cooking vessel to be in heat transfer relationship therewith. This centralized location has been practiced in electrical and gas ranges, and the uniform acceptance of this location may suggest that it is the optimum location. However, I have found that this is not true. In a centralized location, for example, the sensor is exposed to radiant heat energy from the surrounding heating means, whereupon it has been necessary to provide one or more heat shields about the sensor. Also of practical importance is the fact that after even relatively short usage, the bottoms of cooking vessels become dented or otherwise irregular; the central bottom portions of the vessels may be convex or concave, and in such situations, the sensing element may engage the vessel imperfectly, if at all. I have found that it is seldom that the bottom of a cooking vessel is distorted about a peripheral area extending for an inch or more inwardly of the side wall, for said peripheral area is buttressed by this wall. I have determined, therefore, that it is most advantageous to locate the sensing element radially away from the center of the heating unit so that it will be in position to engage this peripheral bottom portion of the vessel, and will be in a location less exposed to the radiant heat of the cooking unit. With respect to electric heating units, I have found, also, that unexpected advantages derive from extending the terminal portions of an electric resistance heating element into the pan supporting area of the heating element, and to locate the temperature sensor adjacent a terminal portion, or preferably between the terminal portions and the respective ends of a unit. The latter advantages derive from the fact that the terminal portions of electric resistance heating elements are made of relatively heavy rods accommodating the maximum wattage of the heating element with substantially no resistance heating of the terminal and thus contributing substantially no heat to the unit upon energization. In fact, the temperature of the sheath at the terminal areas of a heating unit appears to be due almost entirely to heat conduction along the sheath itself. Actually, the sheath temperature in the terminal areas is only about one-half that at the "active" areas of the heating unit. Placing the sensing element adjacent the relatively low temperature terminal portions of the heating element substantially reduces the exposure of the sensing element to radiant heat energy, and minimizes the error in sensor response which has been a troublesome factor in presently known temperature control units. When this aspect of my invention is applied to a gas burner of a gas cooking range, substantially equivalent results may be obtained by blocking off the gas flame orifices for a short distance adjacent the sensing element, whereupon said sensing element will then be exposed to substantially less radiant heat energy.

It is therefore an object of my invention to provide a surface cooking unit in which the sensing element of a temperature control device is associated with the unit at a location minimizing the exposure of the sensing element to radiant heat energy.

It is another object of the invention to provide an electrical resistance heating unit for cooking operations, said unit having a configuration optimizing the location of a temperature sensing element arranged for engagement with the bottom of a cooking vessel.

It is another object of the invention to provide an electrical resistance heating unit arranged to support a cooking vessel, and having a temperature sensing element associated with the unit for heat transfer engagement with a peripheral bottom portion of said vessel.

It is still another object of the invention to provide a surface heating unit of the temperature controlled type in which the sensor is subject to substantially less radiant heat energy than in conventional units, and in which provisions are made for dissipating heat from a housing or body portion of the sensing element.

Other features and advantages of the invention will thus be understood from the following detailed description of presently preferred embodiments read in connection with the accompanying drawings in which:

FIG. 1 is a fragmentary top plan view of an electric cooking appliance embodying my invention;

FIG. 2 is a fragmentary side sectional elevation of the cooking appliance taken on lines 2—2 of FIG. 1, and showing one method of mounting the temperature sensor, said sensor being shown in partially broken away elevational view;

FIG. 3 is a plan view of the heat reflector on which the resistance heating element is supported;

FIG. 4 is a fragmentary elevational view showing a second mounting arrangement for the temperature sensor; and FIG. 5 is a fragmentary somewhat schematic plan view of the surface cooking unit of a gas range, showing the modification of said unit in conformity with the principles of my invention.

Referring initially to FIGS. 1 and 2, I have illustrated my invention in connection with a cooking appliance 1 of the built-in type in which the appliance is arranged to be mounted within an opening in a kitchen countertop 2. As is well known, in such installations the appliances are held in position by "trim strips," a portion 3 of which is shown. Specifically, the trim strip 3 and its accessory components may be as disclosed in More U.S. Patent 2,994,317 granted August 1, 1961. The cooking appliance includes a "rough-in" box 4 of sheet metal, said box having a removable bottom portion 4.1 screw fastened to peripheral wall portions as suggested in FIG. 2. The box provides for any conventional devices (not shown) for the introduction of electric power leads for energizing the heating units such as the cooking unit 5. Because of advantageous characteristics later described, my invention makes it possible to use a very shallow rough-in box; actually, it is entirely satisfactory to have the box not greater than the usual 1¼" thickness of the average countertop. A rough-in box of this limited depth will not encroach on the space normally allotted to drawers or cupboards in the usual kitchen counter. The top panel 6 (hereinafter referred to as the cooking surface or cooking top) of the appliance may be of porcelain enameled or plated metal, as common in the art.

The cooking unit 5 is illustratively of the tubular metallic sheated, electrical resistance type, in which resistance wire 7, wound in helical form, is disposed within a body 8 of heat transmitting, electrically insulating material, such as finely divided magnesium oxide. Said insulating material is highly compacted within a tubular metallic sheath 10. The illustrated cooking unit is of the two-element type, in which the respective elements 5.1 and 5.2 are arranged in a flat spiral form, so that collectively they provide a platform on which may rest a cooking vessel (not shown). In the illustrated arrangement, the terminal end portions of the respective elements 5.1 and 5.2 are in side by side relationship, and extend downwardly through the cooking top 6 into the rough-in box. Thus, as shown in FIGS. 1 and 2, the terminal portions 5.11 and 5.12 extend downwardly through the opening 6.1 of the cook top, and the terminal portions 5.21 and 5.22 extend downwardly through the opening 6.2. As best appears in FIG. 2, these openings are flanged upwardly to provide a rim to intercept any liquid which may spill on the cooking top, and thus prevent passage of such spillage into the rough-in box. The electrical terminals 12, 14 of the element 5.1 and 16, 18 of element 5.2, are rods of nickel-plated steel electrically connected to the respective resistance wires 7 by welding as disclosed in Oakley U.S. Patent 2,546,315 granted March 27, 1951, for "Electric Heater." The rod-like terminals extend well into the cooking platform portion of the heating unit 5, and the passage of current therethrough produces negligible heating of the terminals. The sheath temperature surrounding the terminals is actually only about one half that surrounding the resistance wire 7, and is essentially the result of heat conduction along the sheath itself. For example, where the sheath temperature of the "active" portions of the heating unit may be about 1600° F., the temperature about the terminals is only about 800° F. The respective terminals enter a conventional ceramic insulation block 20 for connection to a lead wire 21, FIG. 2, said lead wire being merely indicative of the lead wires from each of the terminals which connect into a control box 22 having suitable mechanism (not shown) by which the desired temperature control is effected.

Whereas the conventional surface cooking unit is secured to a hinged device fastened to the cooking top, and is supported on a bowl-shaped reflector pan which extends for a substantial distance below the cooking top (as shown in my above-noted Patent 2,565,432) the cooking unit 5 of the present invention is not hinged to the cooking top. It is carried by a relatively flat heat reflector which is wholly above the cooking top. As shown in FIG. 1, convolutions of the units 5.1 and 5.2 are mounted on a three-legged spider 24, and one or more of the convolutions of the respective units may be staked to one or more legs of the spider in conventional fashion; said spider in turn rests upon the heat reflector 25. The heat reflector is flat over all of its area below the heating element, and has an upwardly sloping peripheral portion, as shown. As such, it provides for the stable support of the spider 24. In its preferred form, the reflector comprises upper and lower sheets 25.1 and 25.2, of stainless steel or the like, between which is a sheet or body 26 of a thermally insulating material such as asbestos or glass fiber. The upper sheet is flanged over the lower sheet, as shown, and is welded or otherwise joined thereto to seal the interior against moisture penetration, and thus make the reflector immersible in water for cleaning. Alternatively, the reflector may be of the new high temperature ceramic-like materials such as sold under the trademark "Pyroceram." As illustrated, the bottom sheet 25.2 is configurated to provide three supporting feet such as the foot 25.3, FIG. 2; a ceramic reflector would be provided with similar support means. The feet or embosses maintain the bottom of the reflector in spaced relation to the cooking surface 6, and provide for the flow of cooling air between the cooking surface and the reflector. The weight distribution of the cooking unit 5 is such that it will remain flat on the reflector. When it is necessary to remove the reflector for cleaning, the cooking unit is lifted sufficiently to clear the reflector, and then is allowed to rest on the cooking top until the reflector is replaced. In conventional cooking tops in which the reflector bowl occupies an opening in the cook top which is larger in diameter than the cooking unit and its supporting spider, it is necessary to provide a hinge having a detent which will hold the unit against falling into the cook top opening. Because the hinge had a fixed pivot point, it had previously been necessary to provide a rough-in box having a depth suitable to accommodate the downward swinging movement of the terminal ends of the unit and the attached terminal block. In an appliance embodying the arrangement above described, there is no fixed pivot point, and because of the shallowness and the above-surface location of the heat reflector, it is necessary to raise the heating unit only a small amount to clear the heat reflector for removal.

The above-noted advantages of the heating element and heat reflector construction embodying my invention are substantial in conventional heating units in which the wattage output is controlled by variously connecting the respective elements across 118 volt and 236 volt power connections, as well known in the art. The terminal distribution and the substantially reduced sheath temperature about the treminal portions, however, makes the unit particularly suitable for automatic temperature control.

Considering, for example, the Molyneaux et al. Patent 2,727,975, the sensing element therein disclosed is arranged at substantially the geometrical center of a heating unit; said sensing element includes a thermistor which varies in electrical resistance according to the temperature of the bottom of the cooking vessel, with which it is maintained in contact by a spring or the like. By an electric control network disclosed in said patent, the energy to the resistance coils of the heating unit is modulated according to resistances of a bridge network established when a control knob of a potentiometer, such as the control knob 27 of the control unit 22 of my present disclosure, is adjusted to the desired temperature setting for indicated cooking operation. In view of the fact that the sensing element of Molyneaux et al. is surrounded by a heating element pursuant to conventional practice, and considering that the central portion of said element under full wattage is radiating very substantial heat energy, it is necessary to shield the sensing element by a plurality of heat reflective enclosures. And as earlier noted, the centralized location of the heating element subjects it to the possibility of imperfect engagement with the bottom of a warped or dented cooking vessel.

The present invention disposes the sensing element where it is subjected to much less radiant heat energy, and engages the cooking vessel at a peripheral bottom portion where there is much less possibility of distortion. Looking now at FIG. 2, the sensing unit 30 comprises a capsular sensor 31 which may include a thermistor element (not shown) having the electrical leads 32. The sensor is housed within a cylindrical sleeve 33, and is spring-biased in an upward direction by the spring 34, there being overlapping flanges, as shown, establishing the limit of upward movement. At such limit the top of the sensing element capsule is above the plane of the surface unit 5, whereupon it will be pressed downwardly against the bias of spring 34 when a pan is placed on the unit. The sleeve 33 may be secured relative to the cook top by a clamping band 35 attached to the cook top 6 by means of an angled bracket 36 welded thereto. In the FIG. 2 embodiment, the sleeve 33 passes snugly through an opening in the cook top. To prevent any possible passage of spilled liquids into the rough-in box through a gap which may exist between the sleeve and the cook top, and to provide a thermally conductive path between the sleeve and the cook top, I prefer to provide a sealing layer 37 of any suitable metallic cement which has heat conductive properties. Such cements are well known in the refrigeration art. An alternative sealing arrangement may be as shown in FIG. 4, in which the cooking top 6 is upwardly crimped about the sleeve 33, and a bell or canopy 33.1 is fixed to the sleeve to be in covering relation to the cook top. It will be noted in FIGURE 3 that the reflector 25 is formed with the slot 25.4 so that said reflector is readily removable without disturbing the sensing element.

In each instance, the sensing element is located between the terminal portions and is spaced from the nearest convolution of an active portion of a heating element, thus reducing the influence which the immediately surrounding heating element exerted on the centralized location of sensing elements in presently known temperature controlled surface cooking units. Additionally, the surrounding cooking top 6 accepts heat flow from the sleeve 33 to further reduce the extraneous heat to which contemporary sensing heads have been subjected.

The cooking unit 5 of FIG. 1 is substantially a full size representation of a standard 8-inch electric unit. The broken line P represents the bottom of a 4-inch diameter cooking vessel, and indicates that such a small cooking vessel may be positioned on the cooking unit so that the bottom of the vessel is exposed to a substantial length of the active portions of the respective heating elements 5.1 and 5.2, while the sensing element 31 of the unit 30 is in engagement with a peripheral portion of the vessel. Larger diameter cooking vessels will, of course, be exposed to more of the heating elements as would be necessary for the probably more demanding heat requirements.

FIG. 5 shows the relationship of the sensing element 30 to a gas burning heating unit 40 of conventional design. Present day gas units are annular, and usually about 3 inches in maximum diameter. On a sloping inner wall 41 there are a few gas outlets 42 for simmering or warming; on the flat central portion 43 there is a ring of outlets 44, and on the sloping outer wall 46 there is another series of orifices 47. The combustible mixture is supplied through an appropriately designed pipe or tube 50 which may be integral with the burner head, and usually forms a basis for the support of the heating unit relative to the cook top (not shown). The tube 50 affords a convenient structure on which to mount the sensing unit 30.

Pursuant to the objective of having the sensing head not directly adjacent a high temperature heat source, the orifices 47 of the outer ring 46 terminate a suitable distance on each side of the sinsing unit, whereupon the orifices 44 are the closest to the unit.

From the foregoing description, it is apparent that by simple modification which does not affect the performance of the cooking unit, both electric and gas cooking appliances may be adapted to positioning temperature sensing elements for substantial freedom from extraneous heating, thus making such elements more precisely responsive to the temperature of a cooking vessel placed in heat exchange relation therewith.

While there has been described what is at present thought to be a preferred embodiment of the invention, it will be understood that various modifications may be made therein, and it is intended to cover in the appended claims all such modifications which fall within the true spirit and scope of the invention.

I claim:
1. A cooking appliance comprising, in combination:
    (a) a cooking surface;
    (b) at least one cooking unit disposed on said cooking surface;
    (c) said cooking unit comprising a tubular metallic sheath arranged in a convoluted pattern to provide a platform having a plane surface for supporting a cooking vessel in heat transfer relation therewith;
    (d) said tubular metallic sheath having disposed therein an electric resistance element terminating in elongated electrical terminal means, said terminal means projecting from said sheath at the respective ends thereof for connection to a source of electric power;
    (e) said ends of said sheath and said terminal means being arranged to extend outwardly from said cooking unit in mutually spaced substantially parallel relationship;
    (f) a temperature sensing element positioned at the periphery of said heating unit and disposed between the outwardly extending parallel portions of said terminal means enclosed by said sheath, said sensing element being disposed for heat transfer relation with a vessel placed on said cooking unit;
    (g) said terminal portions within the sheath immediately adjacent said sensing element passing substantial wattage with minimum resistance heating, said sheath about said terminal portions thereby not receiving any appreciable amount of heat energy for transmittal to said sensing element, whereby said sensing element is primarily responsive to temperature change of the bottom of the cooking vessel placed on said heating element.

2. The cooking appliance according to claim 1 further including a metallic shield disposed about said temperature sensing element, and means providing a thermally conductive path between said shield and said cooking platform.

3. The cooking appliance according to claim 1 wherein said temperature sensing device is spring biased for movement into heat transfer relation to a cooking vessel on said platform.

4. The cooking appliance according to claim 1 wherein said sheath is convoluted to provide a substantially circular supporting structure for a cooking vessel and the said terminal portions extend substantially radially therefrom.

5. The cooking appliance according to claim 1 and further including a heat reflector removably disposed on said cooking surface intermediate said surface and said cooking unit.

6. A cooking appliance according to claim 5 in which said heat reflector comprises a heat reflecting sheet having a backing of thermally insulating material.

7. A cooking appliance according to claim 5 wherein said reflector pan has foot portions which maintain the major portion of said pan spaced above said cooking surface.

References Cited by the Examiner

UNITED STATES PATENTS

| | | | |
|---|---|---|---|
| 2,264,270 | 12/1941 | Barnsteiner | 219—460 |
| 2,938,990 | 5/1960 | Levine | 219—441 |
| 3,068,342 | 12/1962 | Jepson et al. | 219—441 |
| 3,171,949 | 3/1965 | McOrlly | 219—450 |
| 3,184,579 | 5/1965 | Wickenberg | 219—441 |

OTHER REFERENCES

Kurz, German application No. 1,049,989, printed February 5, 1959, 2 pp. spec., 1 sheet drawing.

RICHARD M. WOOD, *Primary Examiner.*

L. H. BENDER, *Assistant Examiner.*